G. C. COORS.
APPARATUS FOR FORMING SPARK PLUG INSULATORS.
APPLICATION FILED APR. 14, 1919.

1,362,926.

Patented Dec. 21, 1920.
4 SHEETS—SHEET 1.

Inventor
Grover C. Coors.
By A. J. [signature]
Attorney

G. C. COORS.
APPARATUS FOR FORMING SPARK PLUG INSULATORS.
APPLICATION FILED APR. 14, 1919.
1,362,926.
Patented Dec. 21, 1920.
4 SHEETS—SHEET 2.
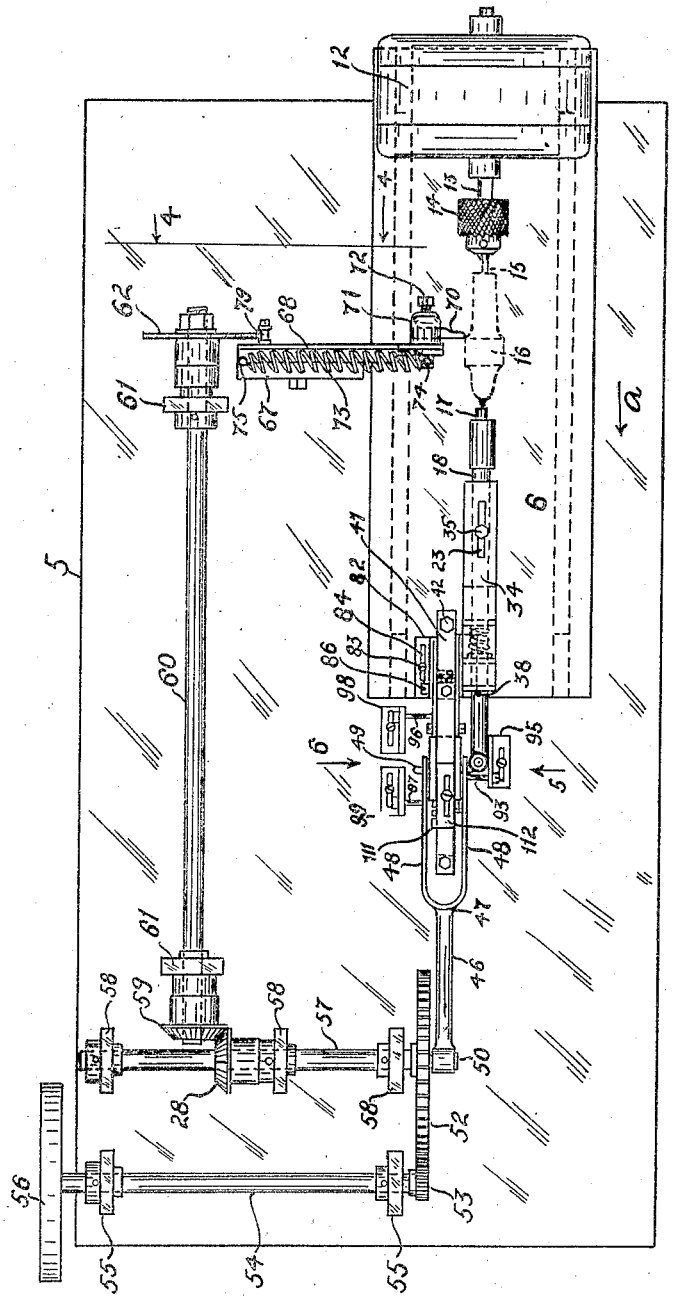
Fig. 2.
Inventor
Grover C. Coors.

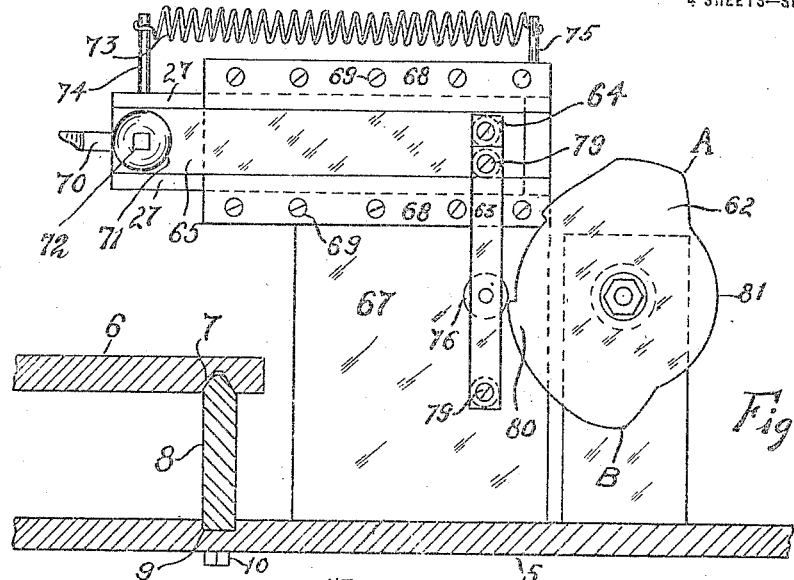

UNITED STATES PATENT OFFICE.

GROVER C. COORS, OF GOLDEN, COLORADO.

APPARATUS FOR FORMING SPARK-PLUG INSULATORS.

1,362,926.   Specification of Letters Patent.   Patented Dec. 21, 1920.

Application filed April 14, 1919.  Serial No. 290,064.

*To all whom it may concern:*

Be it known that I, GROVER C. COORS, a citizen of the United States, residing at Golden, county of Jefferson, and State of Colorado, have invented certain new and useful Improvements in Apparatus for Forming Spark-Plug Insulators; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to apparatus for forming insulators for spark-plugs or other similar articles. Provision is made for rotating a blank composed of clay, partially dried, and preferably in cylindrical form. This blank is mounted on a mandrel or arbor and is located between a rotary chuck and the center of a non-rotary dead center, the chuck and the center together with the motor for operating the chuck being longitudinally reciprocable through the medium of suitable operating mechanism, provision being also made for imparting transverse movement to a tool through the medium of a cam acting in one direction and a spring acting in the other direction, the cam being so shaped as to impart the desired form to the insulator or other device which my improved machine is adapted to produce. As shown in the drawing, the chuck for rotating the mandrel is actuated by an electric motor which is preferable, though it will of course be understood that any suitable power may be employed for this purpose.

The construction is such that the longitudinally reciprocable member has a sufficient length of movement in one direction to finish the insulator, the action of the cam being such as to allow the tool, under the influence of a spring, to move away from the insulator on the return movement during which time the insulator is removed from the chuck and center and another blank put in place, ready to be acted on by the tool as soon as the carriage upon which the motor and other reciprocable parts are mounted, begins the return movement.

Having briefly outlined the apparatus as well as the function it is intended to perform, I will proceed to describe the same in detail, reference being made to the accompanying drawing in which is illustrated an embodiment thereof. In this drawing:

Fig. 2 is a top plan view of the same, showing one of the insulators in dotted lines, the center being disengaged therefrom in order to remove the adjacent end of the mandrel from the center preparatory to disengaging the mandrel from the chuck.

Fig. 4 is a fragmentary section taken through the bed plate and a part of the longitudinally reciprocable carriage on the line 4—4, Fig. 2, the parts being shown on a larger scale.

Fig. 5 is a fragmentary side elevation of the structure looking in the direction of arrow 5, Fig. 2, the parts being shown on a larger scale.

Fig. 6 is a similar view looking in the opposite direction, or in the direction of arrows 6 Fig. 2.

The same reference characters indicate the same parts in all the views.

Figure 1:
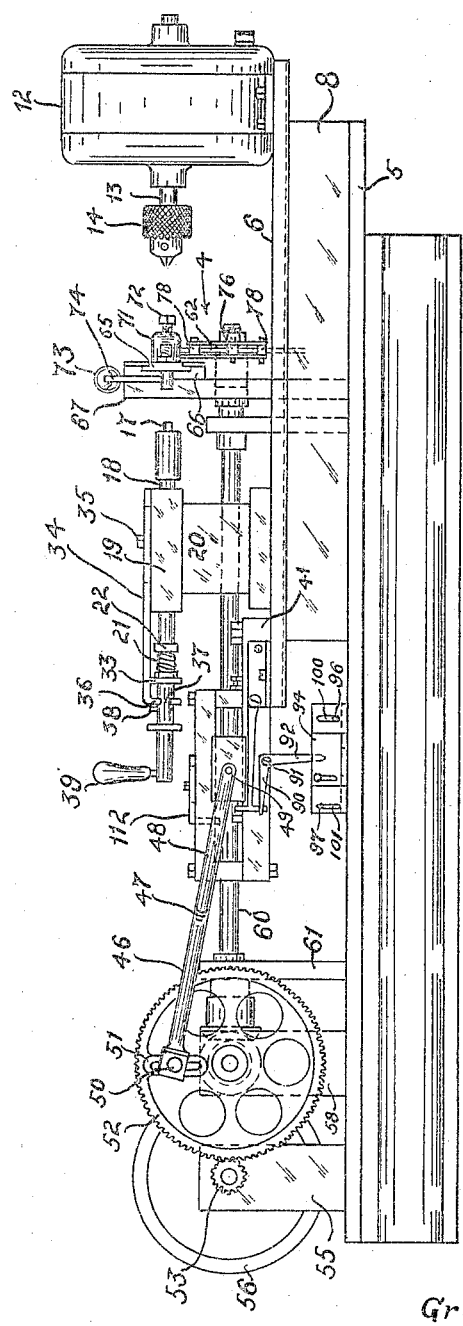
Figure 1 is a side elevation of my improved machine, the blank for forming the insulator being omitted.
Figure 3:
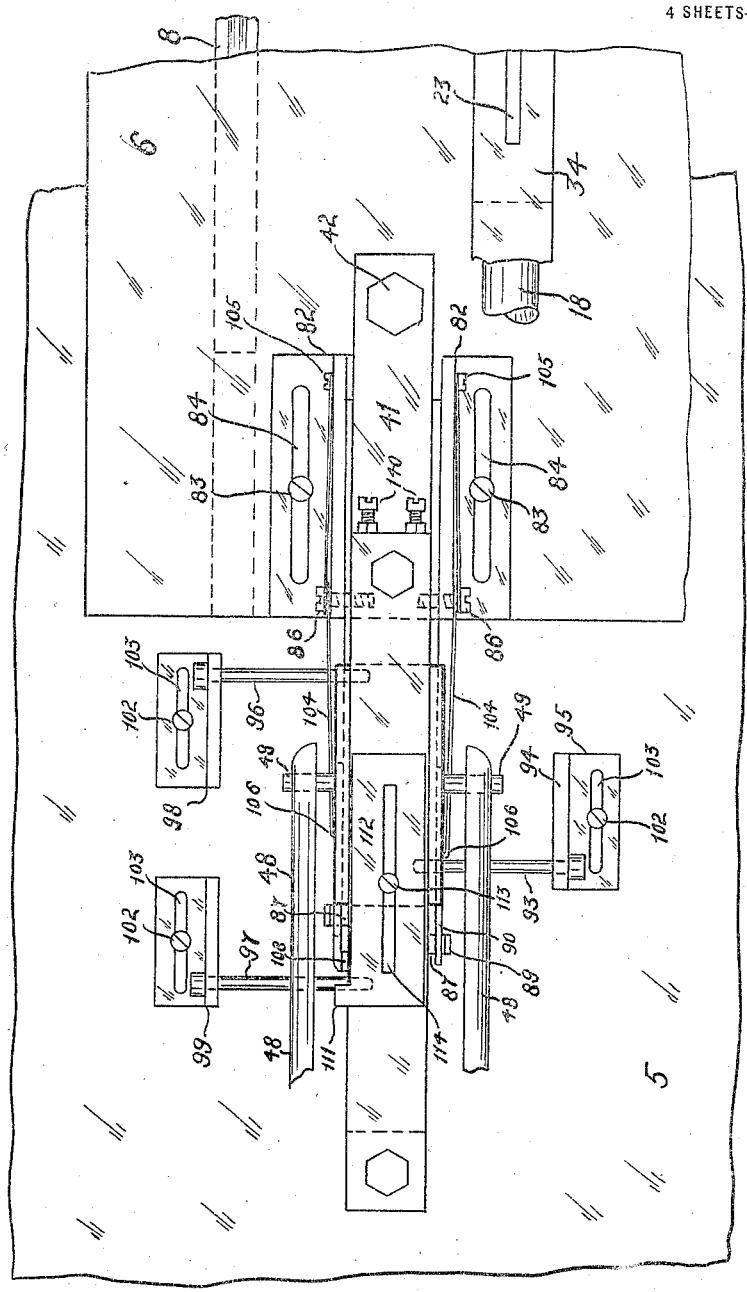
Fig. 3 is a fragmentary top view of a portion of the mechanism shown in Fig. 2, but shown on a larger scale.

Let the numeral 5 designate a stationary bed plate upon which a flat carriage, 6, is mounted to reciprocate longitudinally, the carriage, as illustrated in the drawing, being grooved as shown at 7 to receive the upper V-shaped edges of guide rails or bars 8, which are secured to the bed plate, as shown at 9, by suitable fastening devices 10. An electric motor 12 is mounted upon the carriage 6 and adapted to move therewith, the shaft 13 of the motor carrying a chuck, 14, adapted to receive one extremity of a mandrel 15 which is passed through the blank from which the insulator 16 is to be formed, the opposite extremity of the mandrel being adapted to enter the center 17 of a dead center 18, which is normally non-rotatable, being slidably mounted in the top 19 of a pedestal 20, which is secured to the carriage. The dead center 18 is slidable longitudinally in the top 19, but is normally held in position to engage the mandrel by a spring 21 which is located between a stop collar 22 formed on the center and a stop 33 formed on a plate 34, secured to the top of the part 19 by a set bolt 35, passing through a longitudinal slot 23, formed in the plate 34, whereby the latter is adjustable to regulate the tension of the spring 21. The stop 33 is perforated to receive the center, which is slidable therein. The plate 34 has a depending part 36 in the rear of the stop 33 and is also perforated to receive the center, but has an opening 37 on one side to allow a pin 38 to pass through when the center is released to allow its forward extremity to engage the mandrel. The rear end of the center has a handle 39 to facilitate manipulation.

As shown in Fig. 1 of the drawing, the center is drawn back and given a partial rotation to bring its pin 38 into engagement with the part 31 of the plate 34. This holds the center in position to disengage the mandrel. In order to release the center it is given a partial rotation or moved until its pin 38 is in alinement with the slot 37, when the spring will carry the center longitudinally forward into operative engagement with the mandrel and into coöperative relation with the chuck of the motor.

A rectangular frame, which I will designate in its entirety by the numeral 40, has a forward projection 41, which is secured to the rear extremity of the carriage by a fastening device of any suitable character, as a bolt 42. The body of this frame extends rearwardly from the carriage and is suspended above the bed plate 5. This frame is open, as shown at 43, to receive a crosshead 44, which is slidable therein, the top and bottom parts, 45 and 46, of the frame being shaped to enter top and bottom grooves respectively, formed in the crosshead whereby the frame guides the crosshead during its longitudinal movement in and with the frame. The crosshead is actuated through the medium of a pitman, 46, which is forked, as shown at 47, to form two arms, 48, which are trunnioned upon the crosshead as shown at 49, the opposite extremity of the pitman being adjustably connected as shown at 50 with the slotted web 51 of a gear wheel 52, the pitman being connected beyond the center of the gear in order to give the desired throw or length of stroke to the carriage, as hereinafter more fully explained.

The gear 52 is relatively large and meshes with an operating pinion, 53, fast on a power shaft, 54, journaled in suitable supports 55, stationary with the bed plate and projecting upwardly therefrom, the extremity of the shaft remote from the pitman being equipped with a flywheel 56. As the reciprocating movement of the carriage should be relatively slow, any desired speed-reducing mechanism may be employed, this being indicated by the small pinion on the shaft 54, which meshes with the large gear 52. The construction disclosed will give a considerable speed-reducing effect, which, however, may be extended to any desired degree by such modifications as mechanical skill may suggest.

The gear 52 is fast on a horizontal shaft 57, which is journaled in supports 58, stationary with the base plate and extending upwardly therefrom, the said supports being suitably spaced. The shaft 57 is provided intermediate its extremities with a bevel pinion 28, which meshes with a similar pinion 59, fast on a shaft 60, which extends longitudinally of the bed plate and is journaled in upright supports 61, carried by said plate. Upon the extremity of the shaft 60, remote from the gear 59, is a cam 62, which acts upon a stop arm 63, whose upper extremity is connected, as shown at 64, with a plate 65, slidable in a stationary guide 66, mounted on an upright pedestal 67, which is stationary with the base plate 5. The guide 66 is grooved to receive the slide 65, the latter being flanged as shown at 27 to receive small plates 68, which are secured to the body of the guide by screws 69. A tool 70 is connected with the slide 65, being inserted in a hollow boss 71 and held in place by a set bolt 72. The slide 65 is normally held in such position as to render the tool inactive by a spiral spring 73, one extremity of which is connected with a pin 74, carried by the slide 65, while the other extremity is connected with a pin 75, which is stationary with the pedestal 67. The arm 63 extends downwardly from its slide 65, and its depending part carries a roller, 76, which is mounted between the two members, of which the arm is composed, these members being spaced at their opposite extremities, as shown at 78, and connected by suitable fastening devices, 79.

In the operation of the tool-carrying member for the purpose of forming an insulator, the cam 62 is so shaped on one side, or at the left of the points designated A and B in Fig. 4, that while the left face of the cam is engaging the anti-frictional roller 76, the desired formation will be given to the insulator, assuming that the latter was originally in the form of a cylindrical blank such as is ordinarily used in the production of a device of this kind. The variation in the shape of this face of the cam, which I will designate by the numeral 80, is such as to produce the desired formation in the article acted on, which will be readily understood in view of the purposes for which cams are generally employed. Again, the opposite face of the cam, which I will designate by the numeral 81, and which is at the right of the points A and B, is so shaped as to allow the tool to move away from the article acted on, or to move lengthwise thereof without touching it during the return stroke of the reciprocating movement of the carriage. For instance, assuming that the point of the tool 70 is at the lefthand extremity of the blank (see Fig. 2), at the time the carriage begins its forward movement, or that indicated by the arrow *a* in Fig. 2, by the time the carriage has completed its forward movement, the insulator 16 will be completed and its righthand extremity will be cut at right angles down to the mandrel, thus giving the exact formation required. Then, during the return movement of the carriage, or that opposite the direction indicated by the arrow *a*, the tool will be kept free from the article and the same may be removed from the machine by first moving the center 18 from its position of engagement with the lefthand extremity of the mandrel into the position shown in Fig. 1, where it will be held by the stop pin 38 until the completed insulator with its mandrel has been removed and a new blank and mandrel connected at one end with the chuck, after which the center will be released so that its forward extremity will engage with the opposite end of the mandrel, ready to form another insulator.

In order that the movement of the carriage may be precisely such as to produce the required effect in the formation of insulators of varying shapes and sizes, a number of devices are mounted on the crosshead frame 40 and in its vicinity, and these devices are capable of a relatively wide range of adjustment as hereinafter more fully described.

Attention is called to the fact that the crosshead 44 does not fit closely within the cavity 43 of the frame 40, thus making it possible for the crosshead to move a considerable distance in either direction without actuating the carriage in the absence of other devices for interrupting the independent movement of the crosshead within this frame. On each side of the part 41 of the frame 40, which overlaps the carriage 6 and is secured thereto as heretofore explained, is mounted an angle plate 82, which is secured to the carriage by a set screw 83, passing through a longitudinal slot 84. Pivotally connected with the vertical member of each of these angle plates (as shown at 86), is an arm 85, which extends forwardly from its pivotal point along the frame 40, its forward extremity having an upwardly projecting part 87 and a downwardly projecting part 88, the latter having a lateral extension 89, adapted to engage an arm 90, of a bell crank lever 91, the opposite arm 92 of this lever on one side of the machine extending downwardly far enough to engage a stationary horizontally disposed stop pin 93, which, however, is vertically adjustable by means of a slot 4 in the vertical member 94 of an angle plate 95, to move it beyond the path of the arm 92 when it is not desired that the bell crank lever shall be operated during the formation of the insulator or other device acted on by the machine. When, however, it is desired to interrupt the travel of the carriage during the movement of the crosshead, the arm 92 is brought into engagement with a stop pin, which results in the downward movement of the arm 90, and the corresponding movement of the projection 87, of the arm 85, whereby the said projection is moved out of the path of the crosshead and this cessation of travel of the carriage for a short interval allows the tool 70 to form a square or flat shoulder on the insulator, but where curved shoulders only are required as in the device 16, as designated by dotted lines in Fig. 2, the stop pins such as indicated at 93, are not required.

On the opposite side of the machine from the stop pin 93 are located two other similar pins designated 96 and 97, respectively. These pins are mounted on angle plates, 98 and 99, and the vertical members of these plates are slotted as shown at 100 and 101, whereby they may be adjusted either to engage or disengage the arm 92 of the bell crank lever 91, on that side of the machine. Each of the angle plates 95, 98 and 99, is connected with the bed plate by means of a screw or other suitable fastener, 102, passing through a longitudinal slot 103, whereby each plate may be adjusted longitudinally to bring its pin into the proper position when it is desired that it shall actuate the corresponding bell crank lever 91.

Each of the arms 85 is normally held in such position as to bring its upward projection 87 into the path of the crosshead 44, while the latter is making its forward movement or the stroke during which the shaping of the insulator is accomplished, by a spring, 104, whose rear extremity is anchored on its angle plate 82, by a screw 105, from which point the spring is carried forwardly and formed into a number of convolutions around the pivot 86, of the arm 85, the spring being carried forwardly from this pivot and extending under the arm 85 as shown at 106, thus placing a light upward tension on the arm 85 to hold the upper extremity of its projection 87 in the path of the crosshead, as heretofore explained.

The arm 85 on the side of the frame 40 corresponding with that where the stop pins 96 and 97 are located, has its projection 87 slightly in the rear of the corresponding projection of the pivoted arm on the opposite side. Furthermore, the pivoted arm 85 on the side of the two stops 96 and 97, is provided with an auxiliary member, 107, having a vertical projection 108, which extends slightly above the corresponding projection 87 of the main arm. This auxiliary member 107 has a horizontal part 109, which is slotted longitudinally for purposes of adjustment, the auxiliary member being connected with the body of the arm by screws 110, passing through this slot, thus making the auxiliary member adjustable longitudinally on the arm 85, and equipping the arm 85 with two projections for engaging the crosshead. As shown in the drawing, the projection 87 of one arm 85 is slightly in the rear of the corresponding projection of the other arm, while the projection 108 of the auxiliary member is located foremost of the projections on the two arms 85. Again, a fourth projection, which I will designate 111, extends downwardly from the top of the frame 40 and is a part of a plate 112, which is connected with the frame by a set screw 113, passing through a slot 114, formed in the said plate. This projection 111 may be positioned to engage the crosshead at any desired point in its forward travel.

In the operation of the device, for instance, if it is desired that the crosshead shall engage the projection 108 after the projections 87 of the two arms 85 have been moved downwardly out of the path of the crosshead, this is practicable, since in that event the projections 87 will slidably engage the crosshead underneath but the projection 108 is sufficiently higher than either of the projections 87, so that the projection 108 is still in position to engage the crosshead when the projections 87 are below the same.

In further explanation of the regulation of the travel of the crosshead with relation to the carriage, it may be explained that, assuming that both projections 87 and the projection 108 are normally in position to engage the crosshead through the action of the springs 104, the crosshead, as it begins its forward movement, will take the carriage with it and the rear portion of the insulator will be formed.

Now, if it is desired to form a square or vertical shoulder on the insulator, the stop pin 97 will be so adjusted as to engage the arm 92 of the corresponding bell crank lever and move the rearmost projection 87 downwardly below the crosshead, thus interrupting the travel of the carriage long enough to allow the tool to form a vertical shoulder on the insulator. The crosshead will then engage the other projection 87 when the carriage will continue its travel with the crosshead the desired distance. Again, if it is desired to form another vertical shoulder on the insulator, the other projection 87 will be depressed in a similar manner, thus allowing the carriage another interruption, after which the crosshead will engage the projection 108, which is slightly in the rear of the projection 111. And if it should be desired to form another vertical shoulder, the projection 108 may be depressed by a further actuation of the corresponding bell crank lever 91, through the instrumentality of a stop pin, thus producing another interruption of the carriage, after which the crosshead will finally engage the top projection 111 and complete its forward stroke. Hence, the construction illustrated makes provision for forming three distinct vertical shoulders on an insulator, though it will be readily understood that this feature of the machine may be varied to any extent desired.

From the foregoing description, the use and operation of my improved machine in the formation of a spark plug insulator, or other similar or suitable devices, will be readily understood. Assuming that the carriage 6 is at its rearward limit of movement, or its limit of movement toward the right, referring to Figs. 1 and 2, and that a blank is in position between the chuck 14 and the forward end of the center 18, as the carriage begins its forward movement, the tool 70 will start at the lefthand extremity of the blank and by virtue of the operation of the cam 62 will impart the desired formation to the insulator during the forward travel of the crosshead, without interrupting the travel of the carriage, assuming that curved shoulders only are to be formed on the insulator. However, if it is desired that vertical or square shoulders shall be formed, the stop pins may be so adjusted with reference to the depending arms 92 of the bell crank levers 91 as to produce the desired result, as heretofore fully explained in detail.

It should further be explained that the center 18 may be adjusted longitudinally in its supporting part 19 by loosening the set bolt 35.

Attention is called to the fact that when the machine is in operation, there is a momentary pause at the end of each stroke of the reciprocatory movement of the carriage, during which the tool is carried inwardly to the mandrel. This pause, preparatory to the beginning of the forward stroke, results in moving the tool inwardly to the mandrel, preparatory to the commencement of the formation of the lefthand extremity of the insulator, as shown by dotted lines in Fig. 2; while at the end of the forward stroke of the carriage, the tool moves inwardly to the mandrel to complete the opposite extremity of the insulator, which is made flat. The cam is, of course, constructed to coöperate with the movement of the carriage in producing this result.

Attention is called to the fact that the rear extremity of the frame 40 is provided with a pair of adjustable bolts 140, which protrude into the chamber 43 and are so adjusted as to engage the crosshead during its rearward movement and properly control the corresponding movement of the carriage. By the adjustment of these bolts they are caused to protrude a greater or less distance into the chamber, as may be required, lock nuts being employed for retaining them in the adjusted position.

I claim:

1. In a lathe, the combination of a longitudinally reciprocable work-carrying carriage with a transversely reciprocable tool-carrying carriage, and means for arresting the movement of the work-carrying carriage whereby the movement of the tool-carrying carriage alone will cause the tool to cut at right angles to the axis of the work.

2. In a lathe, the combination of a longitudinally reciprocable work-carrying carriage with a transversely reciprocable tool-carrying carriage, a cam controlling the movement of the tool-carrying carriage, and means for arresting the movement of the work-carrying carriage at an intermediate stage of a stroke in one direction, whereby the movement of the tool-carrying carriage alone will cause the tool to cut at right angles to the axis of the work.

3. In a lathe, the combination of a longitudinally reciprocable work-carrying carriage, a transversely reciprocable tool cooperating with the carriage, a crosshead releasably connected with the carriage for imparting the movement to the carriage, and means for releasing the crosshead from the carriage at an intermediate stage of a stroke in one direction.

4. In a lathe, the combination of a longitudinally reciprocable work-carrying carriage, a transversely reciprocable tool cooperating with the carriage, a crosshead for imparting the movement to the carriage, and adjustable means coöperating with the crosshead for breaking the connection between the latter and the carriage at properly timed intervals.

5. In a lathe, the combination of a longitudinally reciprocable work-carrying carriage, a transversely reciprocable tool coöperating with the carriage, a crosshead for imparting the movement to the carriage, and adjustable means coöperating with the crosshead for making and breaking the connection between the crosshead and carriage at properly timed intervals.

6. In a lathe, the combination of a longitudinally reciprocable work-carrying carriage, a transversely reciprocable tool coöperating with the carriage, a crosshead for imparting the movement to the carriage, and adjustable means coöperating with the crosshead for making and breaking the connection between the crosshead and carriage at properly timed intervals during the movement of the carriage in a given direction.

7. In a lathe, the combination of a longitudinally reciprocable work-carrying carriage, a transversely reciprocable tool coöperating with the carriage, a frame secured to the carriage, a crosshead normally movable in the frame, and adjustable means mounted on the frame for causing the crosshead to pick up the frame and carriage at properly timed intervals.

8. In a lathe, the combination of a longitudinally reciprocable work-carrying carriage, a transversely reciprocable tool coöperating with the carriage, a frame secured to the carriage, a crosshead normally movable in the frame, and adjustable means mounted on the frame and causing the crosshead to pick up and release the carriage alternately.

9. In a lathe, the combination of a longitudinally reciprocable work-carrying carriage, a frame secured to the carriage, a crosshead normally movable in the frame, and adjustable means mounted on the frame and causing the crosshead to pick up and release the carriage alternately during the movement of the crosshead in a given direction.

10. In a lathe, the combination of a longitudinally reciprocable work-carrying carriage, a frame secured to the carriage, a crosshead normally movable in the frame, adjustable means mounted on the frame and causing the crosshead to pick up and release the carriage alternately during the movement of the crosshead in a given direction, and relatively stationary stops coöperating with the said means carried by the crosshead frame.

11. In a lathe, the combination of a longitudinally reciprocable work-carrying carriage, a frame secured to the carriage, a crosshead normally movable in the frame, adjustable means mounted on the frame and causing the crosshead to pick up and release the carriage alternately during the movement of the crosshead in a given direction, and relatively stationary stops coöperating with the said means carried by the crosshead frame, said means including a spring-held pivoted arm having a projection normally in the path of the crosshead.

12. In a lathe, the combination of a longitudinally reciprocable work-carrying carriage, a transversely reciprocable tool coöperating with the carriage, a frame secured to the carriage, a crosshead normally movable in the frame, adjustable means mounted on the frame for causing the crosshead to pick up the frame and carriage at properly timed intervals during the movement of the crosshead in a given direction, said means including a spring-held pivoted arm having a projection mounted in the path of the crosshead, and means for automatically moving said projection out of the path of the crosshead in order to temporarily break the connection between the crosshead and carriage.

13. In a lathe, the combination of a longitudinally reciprocable work-carrying carriage, a transversely reciprocable tool coöperating with the carriage, a frame secured to the carriage, a crosshead normally movable in the frame, and adjustable means mounted on the frame for causing the crosshead to pick up the frame and carriage at properly timed intervals during the movement of the crosshead in a given direction, said means including spring-held pivoted arms mounted on opposite sides of the crosshead frame and having projections normally in the path of the crosshead, the projections of the two arms being differently positioned, whereby they are adapted to successively perform their functions.

14. In a lathe, the combination of a longitudinally reciprocable work-carrying carriage, a transversely reciprocable tool coöperating with the carriage, a frame secured to the carriage, a crosshead normally movable in the frame, adjustable means mounted on the frame for causing the crosshead to pick up the frame and carriage at properly timed intervals, said means comprising a pivoted arm and a bell crank lever, one of the arms of said lever engaging the said pivoted arm, and a relatively stationary trip in the path of the other arm of said lever.

15. In a lathe, the combination of a longitudinally reciprocable work-carrying carriage, a transversely reciprocable tool coöperating with the carriage, a frame secured to the carriage, a crosshead normally movable in the frame, adjustable means mounted on the frame for causing the crosshead to pick up the frame and carriage at properly timed intervals during the movement of the crosshead in a given direction, said means including spring-held pivoted arms mounted on opposite sides of the cross head frame and having projections normally in the path of the crosshead, the projections of the two arms being differently positioned, whereby they are adapted to successively perform their functions, and means for automatically and successively moving said projections out of the path of the crosshead.

16. In a lathe, the combination of a longitudinally reciprocable work-carrying carriage, a transversely reciprocable tool coöperating with the carriage, a frame secured to the carriage, a crosshead normally movable in the frame, adjustable means mounted on the frame for causing the crosshead to pick up the frame and carriage at properly timed intervals during the movement of the crosshead in a given direction, said means including spring-held, pivoted arms mounted on opposite sides of the crosshead frame and having projections normally in the path of the crosshead, the projections of the two arms being differently positioned, whereby they are adapted to successively perform their functions, and means for automatically and successively moving said projections out of the path of the crosshead, said means including bell crank levers carried by the crosshead frame on opposite sides, one arm of each lever engaging the adjacent pivoted arm, and a relatively stationary stop for engaging the other arm of each lever.

17. In a lathe, the combination of a longitudinally reciprocable work-carrying carriage, a transversely reciprocable tool coöperating with the carriage, a frame connected with the carriage, a crosshead normally movable in the frame, adjustable means mounted on the frame for causing the crosshead to pick up the frame and carriage at properly timed intervals during the movement of the crosshead in a given direction, said means including spring-held, pivoted arms mounted on opposite sides of the crosshead frame and having projections normally in the path of the crosshead, the projections of the two arms being differently positioned, whereby they are adapted to simultaneously perform their functions, and means for automatically and successively moving said projections out of the path of the crosshead, said means including bell crank levers carried by the crosshead frame on opposite sides, one arm of each lever engaging the adjacent pivoted arm, and a relatively stationary stop for engaging the other arm of each lever, the stops being adjustable for the purpose set forth.

In testimony whereof I affix my signature.

GROVER C. COORS.